United States Patent [19]

Neal

[11] Patent Number: 4,506,610

[45] Date of Patent: Mar. 26, 1985

[54] SUBSOIL ROTARY CULTIVATOR

[75] Inventor: Archie E. Neal, Garfield, Wash.

[73] Assignee: J. E. Love Co., Garfield, Wash.

[21] Appl. No.: 483,194

[22] Filed: Apr. 8, 1983

[51] Int. Cl.³ .......................... A01C 7/20; A01B 33/06
[52] U.S. Cl. ........................................ 111/87; 172/39; 172/59
[58] Field of Search .......................... 111/1, 7, 85, 87; 172/522, 705, 59, 523, 524, 525, 526, 169, 310, 39

[56] References Cited

U.S. PATENT DOCUMENTS

| 673,304 | 4/1901 | Tharp | 172/522 |
| 1,105,570 | 7/1914 | Lea | 111/87 |
| 2,546,260 | 3/1951 | Forney | 172/169 |
| 2,560,443 | 7/1951 | Hosford | 172/59 |
| 2,804,813 | 9/1957 | Ritchie | 172/169 X |
| 4,042,039 | 8/1977 | Lely | 172/705 X |
| 4,294,181 | 10/1981 | Smith | 111/85 |

FOREIGN PATENT DOCUMENTS

| 124777 | 6/1947 | Australia | 111/85 |
| 152688 | 8/1953 | Australia | 172/522 |
| 2651877 | 5/1978 | Fed. Rep. of Germany | 111/7 |

Primary Examiner—James R. Feyrer
Attorney, Agent, or Firm—Wells, St. John & Roberts

[57] ABSTRACT

Disclosed is a subsoil rotary cultivator. The cultivator can advantageously include a tool bar which is mounted to the tractor in the usual fashion. Group frames are advantageously mounted upon the tool bar and have spring-loaded pivoting arms upon which are mounted main tubular members. The main tubular members support a disc assembly using bearings which are positioned within the main tubular member, preferably at the extreme ends thereof. A central shaft extends through the bearings and main tubular member and has a disc attached transversely at the lower end. A shield tube is attached to the rotating disc assembly and extends upwardly from near the disc thereby providing an exterior surface which rotates with the disc in order to deflect weeds, straw, viney plants, and other debris, thereby preventing the cultivator from becoming plugged when it is drawn through a field.

7 Claims, 4 Drawing Figures

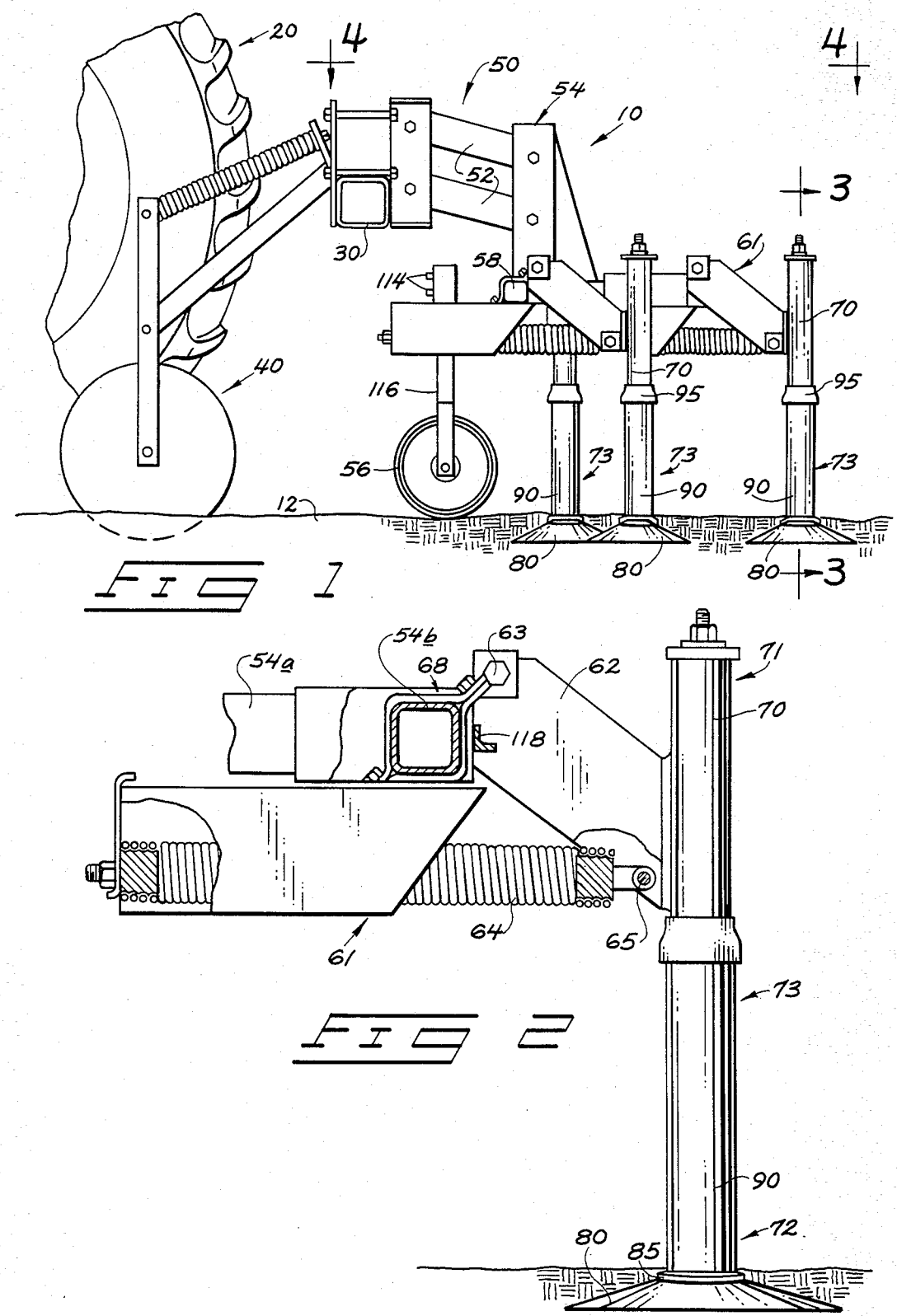

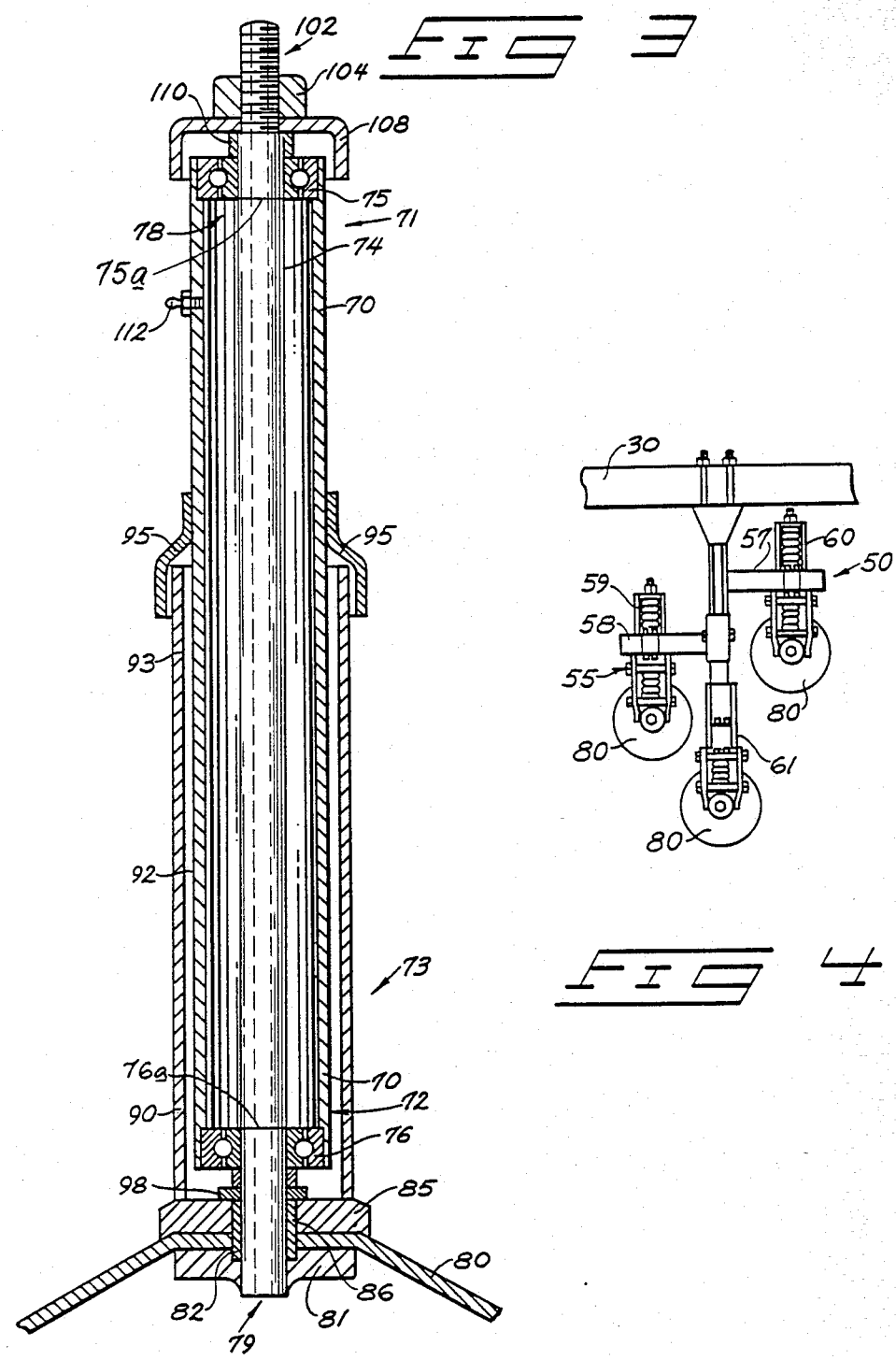

SUBSOIL ROTARY CULTIVATOR

TECHNICAL FIELD

The technical field of this invention is subsoil rotary cultivators having an upstanding axis of rotation and a rotating disc for working the soil.

BACKGROUND OF THE INVENTION

Inventions incorporating rotating horizontal disc cultivators are not new. Examples of patents incorporating such disc cultivators include the following U.S. Pat. No. 459,971 to Arnett; No. 1,370,774 to Abernathy; No. 1,158,906 to Eccles; and No. 556,075 to Whipple. These patents generally show a horizontal disc structure either attached to a shaft or integral therewith for working the soil. The disc and shaft structures rotate about an upstanding axis.

Prior art horizontal disc cultivators often employed no bearings or a journal bearing system which allowed dirt to easily infiltrate into the bearing. The abrasive dirt caused fast wearing of the bearings, supporting upright shaft, or the implement frame itself. When the bearings or frame became worn, the disc tended to vibrate excessively, either from side to side or back and forth.

Another problem associated with prior art horizontal disc cultivators was the buildup of straw, weeds and other debris about the disc shaft or supporting framework. To help alleviate this problem, a number of inventions were made which incorporate scrapers to clean the disc or the disc and disc shaft simultaneously. Examples of inventions incorporating such scrapers include U.S. Pat. No. 673,304 to Tharp; and U.S. Pat. No. 1,105,570 to Lea.

The scraper approach may have been effective at removing the soil from the disc and shaft, but the scraper was very prone to collect weeds and straw. When the buildup of weeds and straw became sufficiently large, it was necessary for the farmer to stop the implement, get off and clean the disc assembly. The problem of accumulated debris has continued until this invention with none of the prior art horizontal disc cultivators being satisfactory in their ability to operate for long periods of time without collecting accumulations of straw and debris.

The prior art also includes U.S. Pat. No. 4,294,181 to Smith. The Smith patent shows a subsoil horizontal disc cultivator having supporting frames for the discs which extend very near to the ground. The disc shaft was made hollow thereby allowing seed and fertilizer to be dropped through the shaft and into the ground while simultaneously cultivating the soil. This arrangement suffered from the problem of collecting straw, debris, and weeds as it was pulled through the field. West German Pat. No. 2,651,877 and Australian Pat. No. 124,777 also show rotatable, horizontal disc cultivators having hollow shafts through which fertilizer or seed could be fed into the ground while simultaneously cultivating the soil.

The current invention is directed to solving the limitations of the prior art as discussed above. In particular, the invention provides a rotatable, horizontal disc cultivator which can be drug through the soil without accumulating weeds and straw. The invention also provides a very rigid and durable bearing support for the rotatable disc and its supporting shaft while also keeping the bearing system protected from dust. Other advantages and objectives of the invention will be apparent from the description given below.

BRIEF DESCRIPTION OF THE DRAWINGS

A preferred form of the present invention is illustrated in the accompanying drawings in which:

FIG. 1 is a side elevational view of an agricultural cultivator implement employing the horizontal disc cultivators of this invention. The implement is shown attached to a tractor for towing through the field;

FIG. 2 is an enlarged side elevational view showing an individual horizontal disc unit and its supporting shaft as it is connected to a portion of the implement frame;

FIG. 3 is a cross-sectional side view of the horizontal disc cultivator as shown in FIGS. 1 and 2;

FIG. 4 is a plan view of a group of horizontal disc cultivators as shown in FIG. 1.

DETAILED DESCRIPTION OF THE PREFERRED EMBODIMENTS

In compliance with the constitutional purpose of the Patent Laws "to promote the progress of science and useful arts" (Article 1, Section 8), applicant submits the following disclosure of the invention.

FIG. 1 shows a cultivator according to this invention. The cultivator is referred to generally by the reference numeral 10 and is adapted for attachment to a towing tractor 20. The implement tool bar 30 is the main structural member of the cultivator and extends transversely across behind the tractor. A coulter wheel assembly 40 is attached at each side of the cultivator to help keep the implement from pitching from side to side when it is pulled over rough or uneven terrain. Coulter wheel assembly 40 is rigidly connected to the tool bar 30 near the ends thereof.

The cultivator frame includes a tool bar 30 and a plurality of group frames 50 which are attached to the tool bar at appropriately spaced points across the tool bar. The group frames 50 each include a pair of parallel links 52 which allow the rearward part 54 of the group frames to shift upwardly and downwardly with respect to the tool bar. A wheel 56 is provided for each group frame to provide rollable support over the soil 12.

Group frame 50 preferably includes two transverse-stub frames 57 and 58 (See FIG. 4) which extend transversely from the group frame rear portion 54. Stub frames 57 and 58 have disc unit mounting frames 59 and 60 mounted thereto respectively. The rear disc unit mounting frame 61 also extends from the rearward part 54 of group frame 50.

Referring now to FIG. 2 we see a side elevational view of the rear disc unit mounting frame 61. Disc unit mounting frame 61 is mounted upon a rearwardly extending arm 54a of frame 54. The disc unit mounting frame 61 is connected to the arm 54a using a set of clamps 68 which bolt about tubular bar 54b. Any other suitable mounting arrangement is also possible.

Disc unit mounting frame 61 includes a pivoting arm 62 which is pivotally connected to the remainder of the frame at pivot 63. A spring 64 extends between the disc unit mounting frame 61 and the pivoting arm 62 and is connected to arm 62 at pivot 65. Pivoting frame arm 62 has a main tubular member 70 rigidly connected thereto.

Refer to FIG. 3 wherein the main tubular member 70 is shown in greater detail. Main tubular member 70 has an upper end 71 and a lower end 72 and is preferably cylindrically shaped. The main tubular member supports the disc assembly 73 using a central shaft 74 which is rotatably supported within main tubular member 70 by upper bearing 75 and lower bearing 76. Upper and lower bearings 75 and 76 are preferably spaced at the ends of main tubular member 70 thereby giving maximum spacing for better support of central shaft 74. Upper and lower bearing 75 and 76 could alternatively be positioned along the main tubular member as particular requirements may arise. Central shaft 74 is preferably coaxially mounted within main tubular member 70. Central shaft 74 may advantageously be provided with shoulders 75a and 76a immediately below upper bearing 75 and above lower bearing 76, respectively, to help positively space the upper and lower bearings. Central shaft 74 can advantageously be hollow (not shown) to thereby allow seed, fertilizer or other soil treatment to drop therethrough.

Central shaft 74 has an upper end 78 and a lower end 79. Lower end 79 extends downwardly below lower bearing 76 and serves as a mount for disc 80. Central shaft 74 can advantageously include an attached or integral hub 81 upon which the horizontal disc 80 can rest.

Disc 80 and shaft 74 are preferably connected so that they will rotate together. This can advantageously be accomplished by using a square insert 82 which has a circular opening therethrough. Square insert 82 fits about the exterior of the lower end of central shaft 74 as indicated in FIG. 3. Square insert 82 is positioned within a square receptical in hub 81 and a square opening through disc 80 thereby assuring that disc 80 and shaft 74 will turn together. Shield plate 85 is also provided with a square opening 86 and square insert 82 extends upwardly to nonrotatably connect shield plate 85 to the shaft 74 and disc 80. The shield plate 85 is spaced from lower bearing 76 using a spacer 98.

The disc assembly 73 also includes a shield tube 90 which is preferably cylindrical and attached to shield plate 85, such as by welding. Shield tube 90 is advantageously mounted coaxial to the longitudinal axis of central shaft 74, thereby allowing it to rotate closely about the exterior of main tubular member 70. A clearance void 92 is provided between shield tube 90 and main tubular member 70 to accommodate flexing and dislocations of either member when the cultivator is used. Shield tube 90 extends upwardly near to the lowest point of connection between pivoting arm 62 and main tubular member 70. A dust shield 95 is rigidly attached to the main tubular 70 immediately above the upper end 93 of shield tube 90. The dust cover 95 flares outwardly and extends over the upper end 93 of shield tube 90 thereby helping to prevent weeds, straw, dust and other debris from infiltrating into the void 92 and becoming lodged therein.

Shield tube 90 is preferably made long enough so that it extends upwardly above the height of most common weeds, straw and other plants being cultivated. The shield tube 90 and disc 80 rotate together in response to varying conditions in the soil and forces applied to the disc or shield tube. Shield tube 90, disc 80 and remaining parts of the disc assembly 73 may rotate in either direction in response to the particular forces being applied. The rotation of shield tube 90 and disc 80 causes weed, straw and viney plants to be easily deflected as the cultivator is pulled through the field. This rotating shield tube is very effective in eliminating the need for the farmer to stop and clear debris from the cultivator, thereby saving great amounts of time and labor and making the job of cultivation more enjoyable.

The upper end of central shaft 74 is preferably provided with threads 102 for threadably receiving a nut 104. Dust cap 108 is positioned between nut 104 and spacer 110. Dust cap 108 extends outwardly and over the upper end of main tubular member 70 thereby reducing dust infiltration into the upper bearing 75. A grease fitting 112 can be advantageously provided in the side of main tubular member 70 so that grease can be supplied to upper and lower bearings 75 and 76.

The cultivator of this invention is used by first attaching the frame to a conventional tractor using any one of available hitching systems. The height of rear portion 54 of group frame 50 is adjusted by varying the vertical position of gauge wheel 56. This can be easily accomplished by loosening bolts 114 (see FIG. 1) and sliding the gauge wheel support 116 upwardly or downwardly as desired.

The cultivator is then towed through soil with the discs 80 penetrating into the soil to provide the desired cultivating action. If a disc or other part of the disc assembly 73 strikes a hard object, the pivot arm 62 rotates upwardly against spring 64 allowing the disc assembly 73 to clear the obstruction and then return to its usual position. A stop 118 is provided on pivot arm 62 to reduce the impact when the pivot arm and rotating disc assembly swing back into the position shown in FIG. 2.

When the cultivator is advantageously provided with a number of group frames 50 across the tool bar 30, then it is possible to adjust the position of the group frames so that the discs of one group frame are arranged to cultivate between adjacent rows of a growing crop. The group frames 50 can also be adjusted so that the swaths of all discs overlap to provide a broad and continuous swath thereby enabling the cultivator to be advantageously used in open-field applications. The cultivator can be adjusted for between-row and open-field applications at any time desired by adjusting the positions of the group frames 50 upon tool bar 30.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:
1. An unpowered subsoil rotating disk cultivator for being pulled behind a tractor or other towing means to cultivate soil, comprising:
   a frame adapted for attachment to the tractor for pulling thereby;
   an upstanding main tubular member having an upper end and lower end, and being mounted to the frame adjacent the upper end of said main tubular member;
   a central shaft having an upper end and a lower end, the central shaft being rotatably and coaxially supported within the main tubular member by upper and lower bearing means seated in said tubular member, allowing the central shaft to freely rotate relative to the main tubular member;

disc means attached transversely to the central shaft near the lower end thereof and freely rotatable therewith, for piercing and cultivating soil as the disk is pulled through and freely rotates by frictional contact with the soil; and a shield tube and means for coaxially connecting the shield tube to the disc means and lower end of the central shaft, to freely rotate therewith; the shield tube extending upwardly from connection with the disc means to encase the lower end and a major length of the main tubular member; the shield tube being diametrically larger than the main tubular member to provide a radial clearance void therebetween; the exterior surfaces of said disc means, shield tube and connecting means rotating simultaneously together to deflect plants and debris and prevent entanglement with the cultivator.

2. The cultivator of claim 1 further comprising a dust shield attached to the main tubular member and extending outwardly and over the shield tube to prevent dust and debris from becoming lodged between the main tubular member and the shield tube.

3. The cultivator of claim 1 wherein said means for coaxially connecting the shield tube comprises a shield plate; the shield tube being rigidly attached to the shield plate; and the shield plate being nonrotatably connected to the central shaft.

4. The cultivator of claim 1 wherein the shield tube extends upwardly adjacent to a mounting of the main tubular member to the frame.

5. The cultivator of claim 1 wherein the central shaft is hollow to allow seed, fertilizer or other soil treatment to be dropped therethrough.

6. The subsoil rotating disk cultivator of claim 1 wherein the frame includes a pivotable arm extending between a substantially horizontal transverse pivot and said main tubular member, allowing the lower end of the main tubular member to tilt backwardly when excessive forces are encounted while being pulled through the soil; and biasing means for biasing the main tubular member into an upright position.

7. A subsoil rotary cultivator, comprising:

a tool bar adapted for attachment to a tractor;

a plurality of group frames attached to the tool bar at laterally spaced positions across the tool bar, the group frames including parallel links for allowing a rearward part of the group frames to shift upwardly and downwardly with respect to the tool bar;

at least one wheel mounted upon the group frames for engaging soil and rollably supporting the group frame thereon;

at least one unit mounting frame connected to each of said group frames; the unit mounting frames including a pivoting arm pivotally connected thereto at an approximately horizontal transverse pivot;

biasing means extending between the pivoting arm and remaining portions of the unit mounting frames for biasing the pivoting arms forwardly;

main tubular members rigidly attached to said pivoting arms in an upstanding orientation; the main tubular members having an upper end and a lower end;

central shafts having an upper end and a lower end; the central shafts being rotatably supported within the main tubular members by at least upper and lower bearing means allowing the central shaft to freely rotate relative to the main tubular member;

disc means attached transversely to the central shaft near the lower end thereof, for piercing and cultivating soil;

a shield tube connected to the central shaft and disc means, and encasing the lower end of the main tubular member; the shield tube extending upwardly from the lower end of the central shaft to a height above the soil and wherein said shield tube extends over the major length of said main tubular member between attachment of the main tubular member to said pivoting arm and said disc means; the shield tube being freely rotatable with the disk and central shaft so that soil, plants and other debris are deflected as the shield tube rotates as the cultivator is pulled through the soil.

* * * * *